(12) United States Patent
Chen

(10) Patent No.: US 8,094,951 B2
(45) Date of Patent: Jan. 10, 2012

(54) CODING SYSTEM AND METHOD FOR A BIT-PLANE

(75) Inventor: Ying-Ru Chen, Tainan (TW)

(73) Assignee: Himax Technologies Limited, Tainan County (TW)

( * ) Notice: Subject to any disclaimer, the term of this patent is extended or adjusted under 35 U.S.C. 154(b) by 966 days.

(21) Appl. No.: 12/036,200

(22) Filed: Feb. 22, 2008

(65) Prior Publication Data

US 2009/0213142 A1 Aug. 27, 2009

(51) Int. Cl.
*G06K 9/36* (2006.01)
*G09G 5/00* (2006.01)
*G06K 9/46* (2006.01)

(52) U.S. Cl. ........................ 382/232; 345/640

(58) Field of Classification Search .................. 382/162, 382/164, 173, 224, 232, 233, 240, 244–246, 382/253, 239; 345/533, 545, 590–592, 634, 345/640; 348/420.1
See application file for complete search history.

(56) References Cited

U.S. PATENT DOCUMENTS

| | | | | |
|---|---|---|---|---|
| 4,757,309 A * | 7/1988 | Bowater et al. | ............... | 345/589 |
| 4,893,116 A * | 1/1990 | Henderson et al. | ........... | 345/592 |
| 4,951,229 A * | 8/1990 | DiNicola et al. | .............. | 345/533 |
| 5,220,646 A * | 6/1993 | Fossum | ........................ | 345/422 |
| 5,250,928 A * | 10/1993 | Kuriki | ........................... | 345/593 |
| 5,254,984 A * | 10/1993 | Wakeland | ..................... | 345/634 |
| 5,461,680 A * | 10/1995 | Davis | ........................... | 382/276 |
| RE35,414 E * | 12/1996 | Murakami et al. | .......... | 348/420.1 |
| 5,812,787 A * | 9/1998 | Astle | ............................. | 709/247 |
| 6,157,746 A * | 12/2000 | Sodagar et al. | ............... | 382/240 |
| 7,668,380 B2 * | 2/2010 | Marcellin et al. | ............. | 382/232 |
| 2002/0075502 A1 * | 6/2002 | Hayama | ...................... | 358/1.15 |
| 2002/0168105 A1 * | 11/2002 | Li | ................................. | 382/170 |
| 2003/0063802 A1 * | 4/2003 | Li et al. | ........................ | 382/199 |
| 2003/0133617 A1 * | 7/2003 | Mukherjee | .................... | 382/239 |
| 2004/0174361 A1 * | 9/2004 | Yomdin et al. | ............... | 345/441 |
| 2009/0213142 A1 * | 8/2009 | Chen | ............................ | 345/640 |

* cited by examiner

*Primary Examiner* — Amir Alavi
(74) *Attorney, Agent, or Firm* — Stout, Uxa, Buyan & Mullins, LLP

(57) ABSTRACT

A coding system and method for a bit-plane is disclosed. A bit-plane is decomposed or segmented into at least a background area and a foreground area. A number of encoders are provided for efficiently encoding the background area and the foreground area respectively. Accordingly, the performance of compression is substantially improved by this data or texture segmentation.

22 Claims, 6 Drawing Sheets

CODING SYSTEM AND METHOD FOR A BIT-PLANE

BACKGROUND OF THE INVENTION

1. Field of the Invention

The present invention generally relates to data compression, and more particularly to data segmentation for the data compression.

2. Description of Related Art

Modern electronic devices, such as television sets, DVD players, or even computers, display additional information superimposed on a screen picture, which is commonly known as on-screen display (OSD). The OSD provides users more function or control, such as channel or volume adjustment, over the electronic devices. The OSD is displayed either in character mode or graphic mode. The OSD data in either mode are usually stored in a memory device, such as read only memory (ROM). As each OSD is stored as an image, the required amount of the memory device is large and costly.

Image compression is therefore employed to reduce redundancy of the OSD data in order to be able to store the OSD data in an efficient way. Run-length coding is usually utilized to perform the compression, which takes advantage of the fact that nearby pixels in the image are probably have the same brightness. Consequently, the run-length code is made of a brightness value, followed by the number (or run-length) of pixels that have the same brightness value. For example, if twelve consecutive pixels have the same brightness value of 150, these pixels could be then encoded as two-byte code (150, 12). The compression ration is thus 6 (=12 bytes/2 bytes). Even though the run-length coding is beneficial to most images, this coding technique, however, tends to have data explosion that does not compress but expand the image data under some circumstances such as coding a small image like the OSD.

For the foregoing reasons, a need has arisen to propose a technique for effectively compressing some specific images, particularly the OSD images.

SUMMARY OF THE INVENTION

In view of the foregoing, it is an object of the present invention to improve the performance of compression by data segmentation.

According to the embodiment of the present invention, the coding system and method for a bit-plane comprises means for decomposing a bit-plane into at least a background area and a foreground area; and a number of encoders for respectively encoding the background area and the foreground area. Accordingly, the performance of compression is substantially improved by this data (or texture) segmentation.

DETAILED DESCRIPTION OF THE INVENTION

Figure 1:
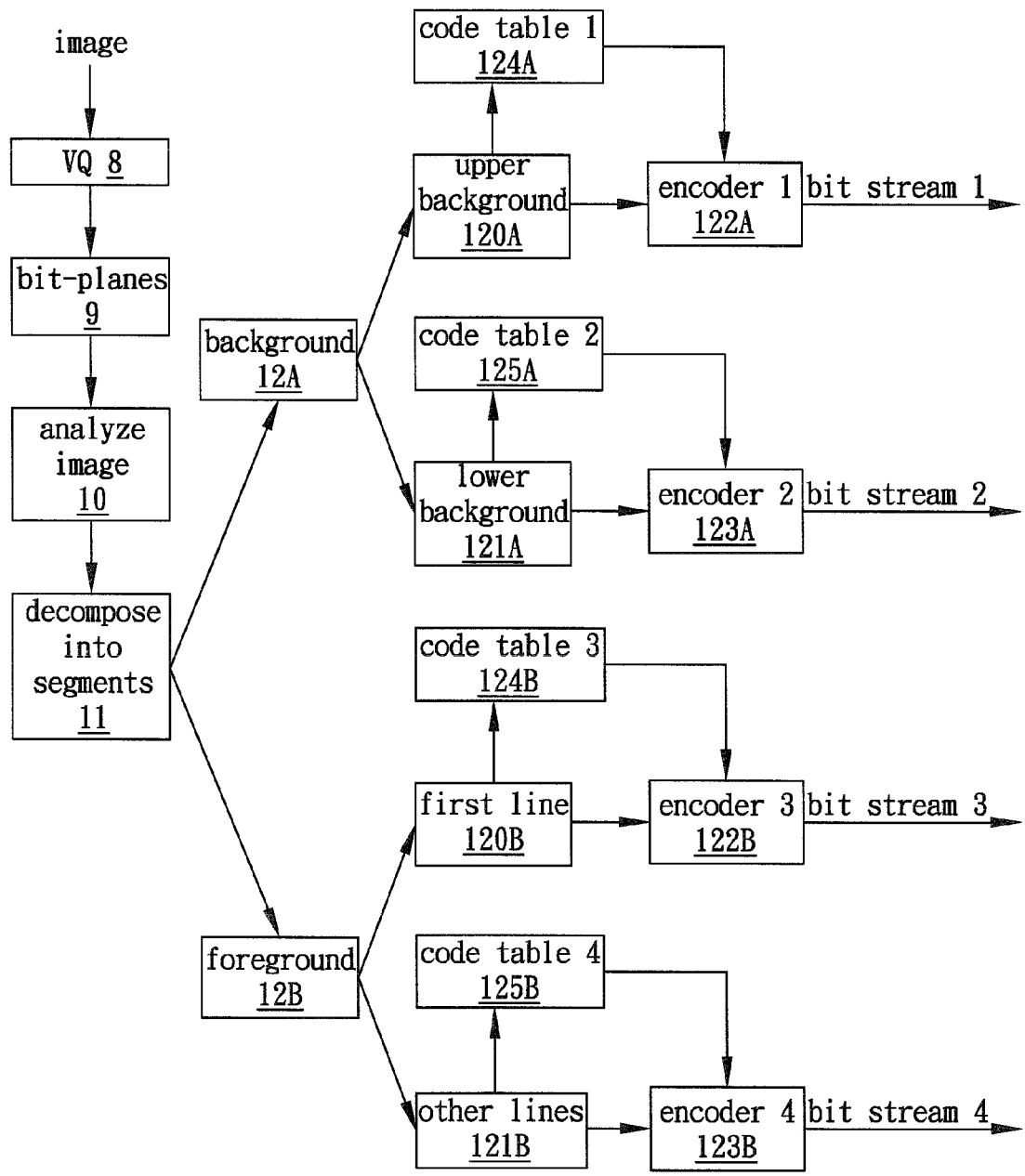
FIG. 1 illustrates apparatus and method of data segmentation according to one embodiment of the present invention.

FIG. 1 illustrates apparatus and method of data segmentation according to one embodiment of the present invention. In the embodiment, an on-screen display (OSD) image is under segmentation. However, image other than the OSD can be under segmentation as well. The OSD image is pre-processed by, for example, vector quantization (abbreviated VQ, and also called block quantization or pattern matching quantization) 8, which encodes data from a multidimensional vector space into lower dimension vector space by using a codebook (or code table/lookup-table). The output of the VQ 8 is broken into a number of bit-planes 9. A bit-plane contains bits having the same position in the respective binary numbers. For example, a 5-bit image output of the VQ 8 can be broken into five bit-planes, each of which has only brightness value "0" or "1", such as those shown in FIG. 2A and FIG. 2B. For example, the first bit-plane contains the most significant bits, and the fifth bit-plane contains the least significant bits.

Referring again to FIG. 1, the bit-plane image is analyzed (block 10). As will be understood later, the bit-plane image is analyzed or scanned to determine whether the line contains all-zero pixels or not. Subsequently, in the block 11, the image is decomposed according to the previous analysis into a number of segments (or areas) such that the pixels in the each segment have the same or similar characteristics, for example, in statistics. In the present embodiment concerning the OSD image, the image is decomposed into background area 12A and foreground area 12B. The background 12A is defined in this embodiment as containing all-zero lines, that is, the pixels in each line have the same brightness value, such as "0". The foreground 12B is defined in this embodiment as containing non-all-zero lines, that is, portion of the pixels in each line have brightness value (such as "1") different from the brightness value (such as "0") of other pixels in the same line.

Figure 2A:
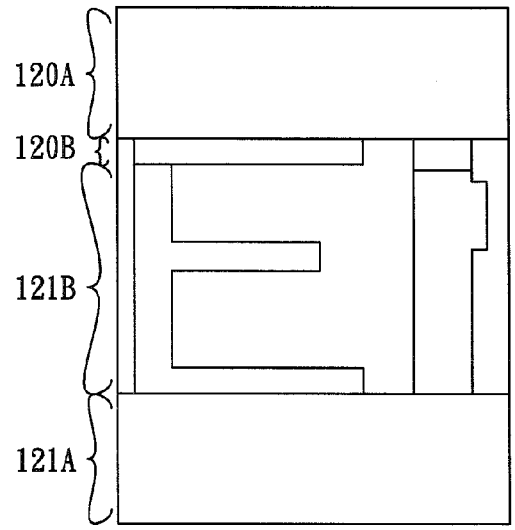
FIG. 2A shows an exemplary OSD font that is in the character mode.
Figure 2B:
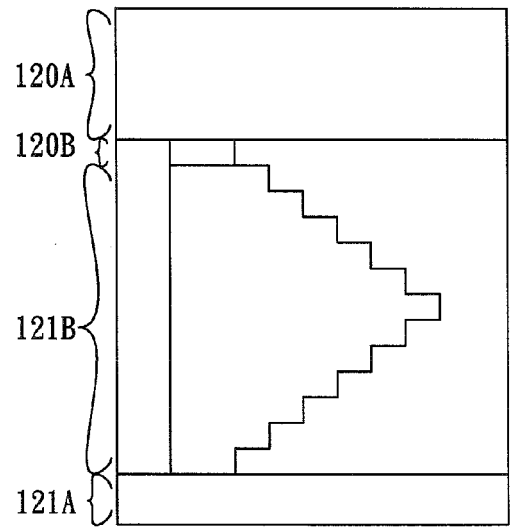
FIG. 2B shows an exemplary OSD icon that is in the graphic mode.

FIG. 2A shows an exemplary OSD font that is in the character mode, and FIG. 2B shows an exemplary OSD icon that is in the graphic mode. In the figures, the background 12A includes two noncontiguous parts—an upper background 120A and a lower background 121A. As mentioned before, each line in the area 120A or 121A contains all-zero lines. On the other hand, the foreground 12B includes a number of contiguous non-all-zero lines, including a first block containing at least one first non-all-zero line 120B located in the first line of the foreground, and a second block containing other non-all-zero lines 121B following the first non-all-zero line 120B until the end line of the foreground 12B.

The upper background 120A, the lower background 121A, the first non-zero-line 120B, and the other non-all-zero lines 121B are then subjected to distinct encoders 122A, 123A, 122B and 123B, respectively. The encoders 122A-123B may all be different, or may be partially different. Suitable coding techniques are chosen respectively for the encoders 122A-123B, such that each encoder (122A, 123A, 122B or 123B) could effectively encode the segmented data. The effectiveness of these encoders 122A-123B usually depends on the optimal compression ratio, the fast compression time, or the compromise between the compression ratio and time according to need in the specific application. It is noted that auxiliary code tables 124A, 125A, 124B and 125B may be optionally utilized with the encoders 122A-123B for the purpose of either accompanying or accelerating the operation of the encoders 122A-123B. The code tables 124A-125B may contain statistical information, such as the frequencies of the occurrence of the image. The output bit streams out of the encoders 122A-123B are then stored in one or more memory devices such as the read only memory (ROM) devices, and the stored data are later retrieved for display on a display device such as the TV screen or a liquid crystal display (LCD).

Figure 3:
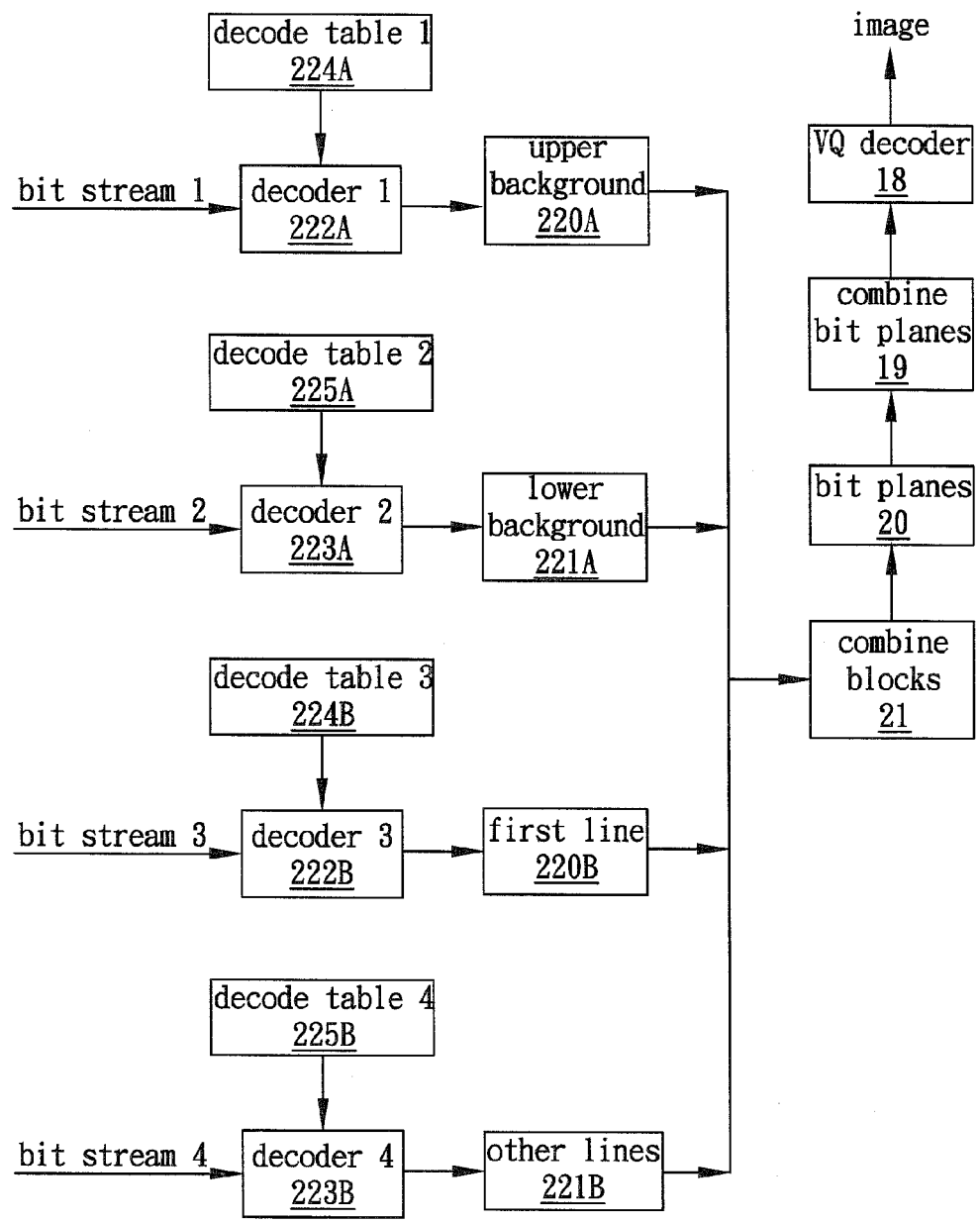
FIG. 3 illustrates apparatus and method of decoding the code generated by the apparatus and method of FIG. 2.

FIG. 3 illustrates apparatus and method of decoding the code generated by the apparatus and method of FIG. 2. The bit streams 1-4 previously stored in the memory device(s) are now retrieved and respectively inputted to decoders 222A, 223A, 222B and 223B, which use corresponding decoding techniques which are the reverse of the coding techniques used in FIG. 2. Auxiliary decode tables 124A, 125A, 124B and 125B may be optionally utilized with the decoders 222A-223B for the purpose of either accompanying or accelerating the operation of the decoders 222A-223B. The decoders 222A-223B convert the bit streams back into the upper background 220A, the lower background 221A, the first non-all-zero line 220B, and the other non-all-zero lines 221B. The decoded blocks 220A-221B are then combined together (block 21), resulting in a bit-plane image (block 20). All bit-planes are combined (block 19) and then subjected to a VQ-decoder (block 18) that performs the inverse of the VQ encoder 8 (FIG. 1).

Figure 4A:
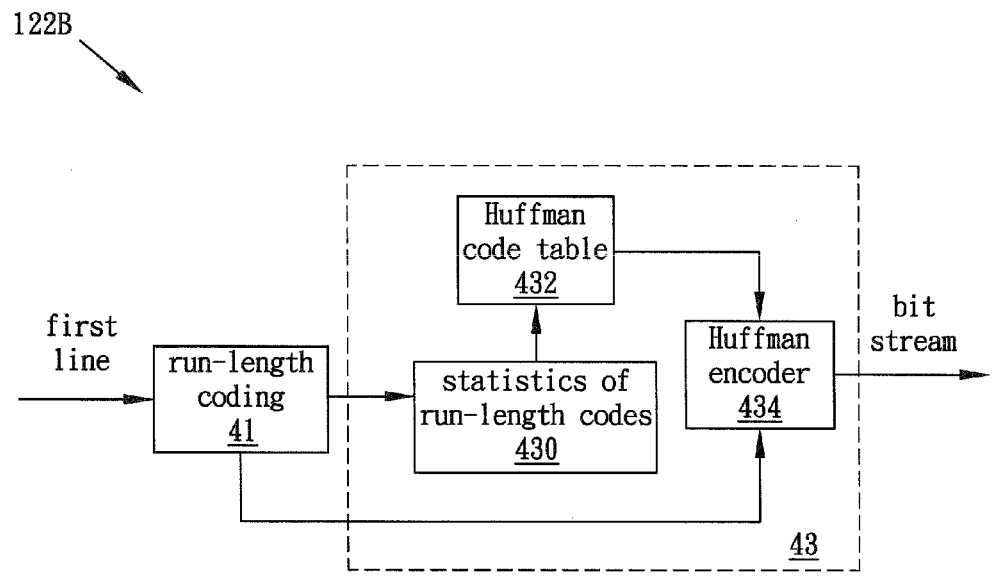
FIG. 4A illustrates apparatus and method of the encoder in FIG. 1 acting on the first non-zero-line of the foreground according to one embodiment of the present invention.

FIG. 4A illustrates apparatus and method of the encoder 122B (FIG. 1) acting on the first non-zero-line 120B of the foreground 12B according to one embodiment of the present invention. The first non-zero-line 120B in the bit-plane is encoded by run-length coding 41, resulting in the bit-plane run-length coding. It is advantageous to apply the run-length coding on the individual bit-plane for the reason that there is no necessity to denote the brightness value in the resultant run-length code. The run-length code is then subjected to Huffman coding 43. Specifically, in the Huffman coding 43, the frequencies (or statistics) of occurrence in the run-length codes are collected 430. A Huffman code table 432 is then generated according to these statistics. In the Huffman code table 432, smaller codes are assigned to the run-length code with the most-frequent occurrence and longer codes are assigned to the run-length code with the least-frequent occurrence. The Huffman coding is performed by a Huffman encoder 434 according to the Huffman code table 432, resulting in Huffman coded bit stream.

Figure 4B:
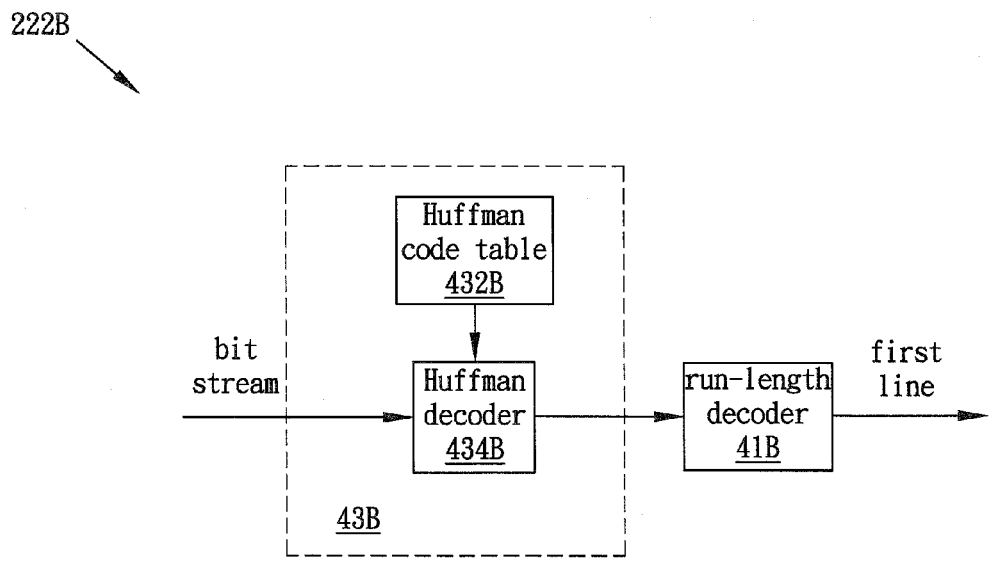
FIG. 4B illustrates corresponding decoder in FIG. 3 for decoding the Huffman coded bit stream into the first non-zero-line of the foreground according to one embodiment of the present invention.

FIG. 4B illustrates corresponding decoder 222B (FIG. 3) for decoding the Huffman coded bit stream into the first non-zero-line 120B of the foreground 12B according to one embodiment of the present invention. Specifically, the Huffman decoding 43B is performed by a Huffman decoder 434B according to a Huffman code table 432B. The Huffman-decoded bit stream is then decoded by a run-length decoder 41B, resulting in the first non-zero-line 120B of the foreground 12B.

Figure 5A:
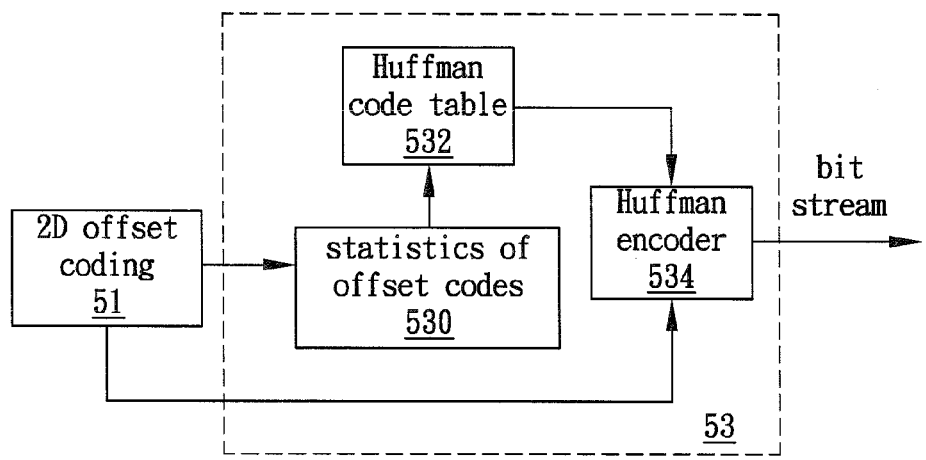
FIG. 5A illustrates apparatus and method of the encoder in FIG. 1 acting on the block containing all non-all-zero lines following the first non-all-zero line according to one embodiment of the present invention.

FIG. 5A illustrates apparatus and method of the encoder 123B (FIG. 1) acting on the block containing all non-all-zero lines 121B following the first non-all-zero line 120B until the end line of the foreground 12B according to one embodiment of the present invention. The block in the bit-plane is firstly encoded by a two-dimensional offset coding 51.

Figure 5B:
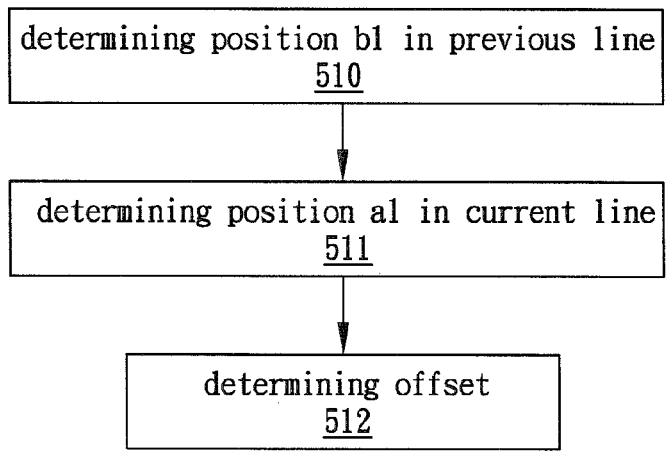
FIG. 5B shows a flow diagram illustrating the two-dimensional offset coding according to one embodiment of the present invention.
Figure 5C:
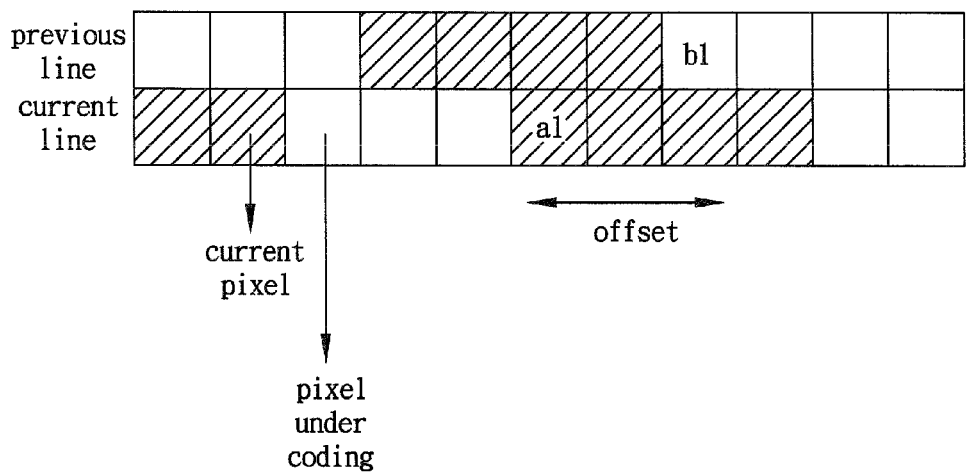
FIG. 5C shows a simplified example illustrating the two-dimensional offset coding.

FIG. 5B shows a flow diagram illustrating the two-dimensional offset coding according to one embodiment of the present invention, and FIG. 5C shows a simplified example. In step 510, a first position b1 in the previous line is determined. The first position b1 in the previous line is defined, in the embodiment, as the firstly occurred pixel that (1) has a brightness value different from the current pixel, (2) locates to the right of the current pixel, and (3) locates at the transition of brightness change. For example, b1 in FIG. 5C is the position of the firstly occurred pixel that has the brightness value "1" (white) different from the current pixel ("0" (black)), locates to the right of the current pixel, and locates at the transition from "0" to "1".

In step 511, a second position a1 in the current line is determined. The second position a1 in the current line is defined, in the embodiment, as the firstly occurred pixel that locates at the transition of brightness change following the pixel under coding (i.e., the pixel just right to the (encoded) current pixel). For example, a1 in FIG. 5C is the position of the firstly occurred pixel that locates at the transition of brightness change (from "1" to "0" in this instance) following the pixel under coding.

In step 512, an offset between the position a1 and the position b1 is determined. The offset is defined, in the embodiment, as the lateral distance from the position b1 to the position a1. For example, in FIG. 5C, the distance (i.e., the offset) from the position b1 to the position a1 is "−2".

Referring again to FIG. 5A, the offset code is then subjected to Huffman coding 53. Similarly to FIG. 4A, in the Huffman coding 53, the frequencies (or statistics) of occurrence in the offset codes are collected 530. A Huffman code table 532 is then generated according to these statistics. In the Huffman code table 532, smaller codes are assigned to the offset code with the most-frequent occurrence and longer codes are assigned to the offset code with the least-frequent occurrence. The Huffman coding is performed by a Huffman encoder 534 according to the Huffman code table 532, resulting in Huffman coded bit stream.

Figure 5D:
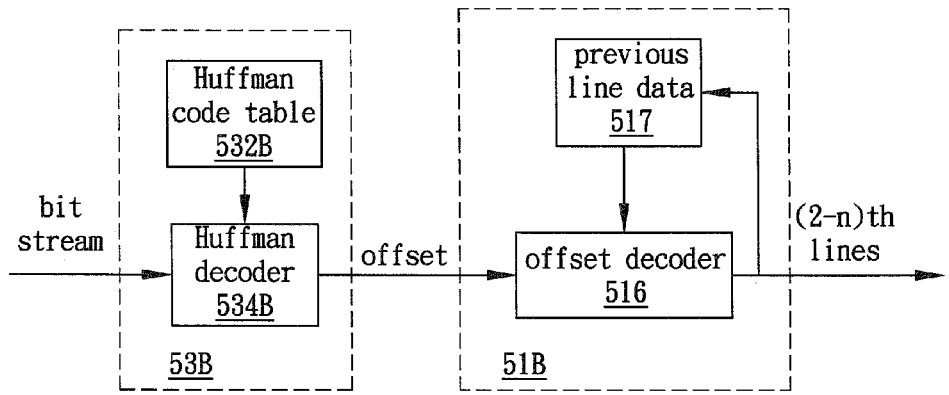
FIG. 5D illustrates corresponding decoder in FIG. 3 for decoding the Huffman coded bit stream into the block containing all non-all-zero lines following the first non-all-zero line according to one embodiment of the present invention.

FIG. 5D illustrates corresponding decoder 223B (FIG. 3) for decoding the Huffman coded bit stream into the block containing all non-all-zero lines 121B following the first non-all-zero line 120B until the end line of the foreground 12B according to one embodiment of the present invention. Specifically, the Huffman decoding 53B is performed by a Huffman decoder 534B according to a Huffman code table 532B. The Huffman-decoded bit stream is then decoded by offset decoding 51B, resulting in the block containing all non-all-zero lines 121B following the first non-all-zero line 120B of the foreground 12B. Specifically, the offset decoding 51B is performed by an offset decoder 516 accompanied with a storage area 517 for storing previous line data.

According to the embodiment illustrated above, the performance of compression is substantially improved by data (or texture) segmentation. Moreover, the foreground 12B of the OSD images (e.g., FIG. 2A and FIG. 2B) may be further compressed to improve the performance of the OSD display. The embodiment of the present invention is well suitable for the OSD compression and other image with dimension comparable to that of the OSD image, but is also suitable for the compression of images with different dimension.

Although specific embodiments have been illustrated and described, it will be appreciated by those skilled in the art that various modifications may be made without departing from the scope of the present invention, which is intended to be limited solely by the appended claims.

What is claimed is:

1. A coding system for a bit-plane, comprising:
   means for separating an image into a plurality of bit-planes;
   means for decomposing each of the bit-planes into at least a background area and a foreground area; an
   a plurality of encoders for respectively encoding the background areas and the foreground areas of the bit-planes.

2. The system of claim 1, wherein the background area comprises a plurality of lines, wherein all pixels in each line have same brightness value.

3. The system of claim 1, wherein the foreground area comprises a plurality of lines, wherein at least one pixel in each line has brightness value different from brightness value of other pixels in the same line.

4. The system of claim 1, further comprising means for dividing the background area into an upper background block and a lower background block.

5. The system of claim 4, further comprising means for dividing the foreground area into a first block including a first line of the foreground area, and a second block including a plurality of lines following the first line.

6. The system of claim 5, further comprising a plurality of decoders for respectively decoding the encoded upper background area, the encoded lower background area, the encoded first block, and the encoded second block.

7. The system of claim 1, further comprising a plurality of code tables for use with the plurality of encoders respectively, each of the code tables containing statistical information of the bit-plane.

8. The system of claim 1, further comprising a vector quantization (VQ) encoder for encoding an image.

9. The system of claim 8, further comprising means for the VQ-encoded image into a plurality of bit-planes.

10. The system of claim 1, wherein the encoder for encoding the foreground area comprises;
    a two-dimensional offset coding unit coupled to receive a plurality of lines following the first line of the foreground area, thereby generating an offset code; and
    a Huffman coding unit coupled to receive the offset code, thereby generating a Huffman coded bit stream.

11. The system of claim 10, wherein the two-dimensional offset coding unit performs the following steps:
    determining a first position in the previous line, the first position being a first occurring pixel that has a brightness value different from a current pixel, is located to the right of the current pixel and is located at the transition of brightness change;
    determining a second position in the current line, the second position being a first occurring pixel that is located at the transition of brightness change following a pixel under coding; and
    determining the offset code between the first position and the second position as a lateral distance from the second position to the first position.

12. A coding method for a bit-plane, comprising using a processor to perform the steps of:
    separating an image into a plurality of bit-planes;
    decomposing each of the bit-planes into at least a background area and a foreground area; and
    respectively encoding the background areas and the foreground areas of the bit-planes.

13. The method of claim 12, wherein the background area comprises a plurality of lines, wherein all pixels in each line have same brightness value.

14. The method of claim 12, wherein the foreground area comprises a plurality of lines, wherein at least one pixel in each line has brightness value different from brightness value of other pixels in the same line.

15. The method of claim 12, further comprising a step of dividing the background area into an upper background block and a lower background block.

16. The method of claim 15, further comprising a step of dividing the foreground area into a first block including a first line of the foreground area, and a second block including a plurality of lines following the first line.

17. The method of claim 16, further comprising a step of respectively decoding the encoded upper background area, the encoded lower background area, the encoded first block, and the encoded second block.

18. The method of claim 12, further comprising providing a plurality of code tables for use with the encoding of the background area and the foreground area respectively, each of the code tables containing statistical information of the bit-plane.

19. The method of claim 12, further comprising a step vector quantization (VQ) encoding an image.

20. The method of claim 19, further comprising a step of dividing the VQ-encoded image into a plurality of bit-planes.

21. The method of claim 12, wherein the foreground area is encoded by the following steps:
    two-dimensional offset coding a plurality of lines following the first line of the foreground area, thereby generating an offset code; and
    Huffman coding the offset code, thereby generating a Huffman coded bit stream.

22. The method of claim 21, wherein the two-dimensional offset coding step comprises the following sub-steps:
    determining a first position in the previous line, the first position being a first occurring pixel that has a brightness value different from a current pixel, is located to the right of the current pixel and is located at the transition of brightness change;
    determining a second position in the current line, the second position being a first occurring pixel that is located at the transition of brightness change following a pixel under coding; and
    determining the offset code between the first position and the second position as a lateral distance from the second position to the first position.

* * * * *